March 19, 1935. R. LAPSLEY 1,994,773
TRANSMISSION
Filed March 28, 1932 2 Sheets-Sheet 1

Inventor:
Robert Lapsley
By Brown Jackson Bottuns Dunner
Attys.

March 19, 1935.  R. LAPSLEY  1,994,773
TRANSMISSION
Filed March 28, 1932   2 Sheets-Sheet 2
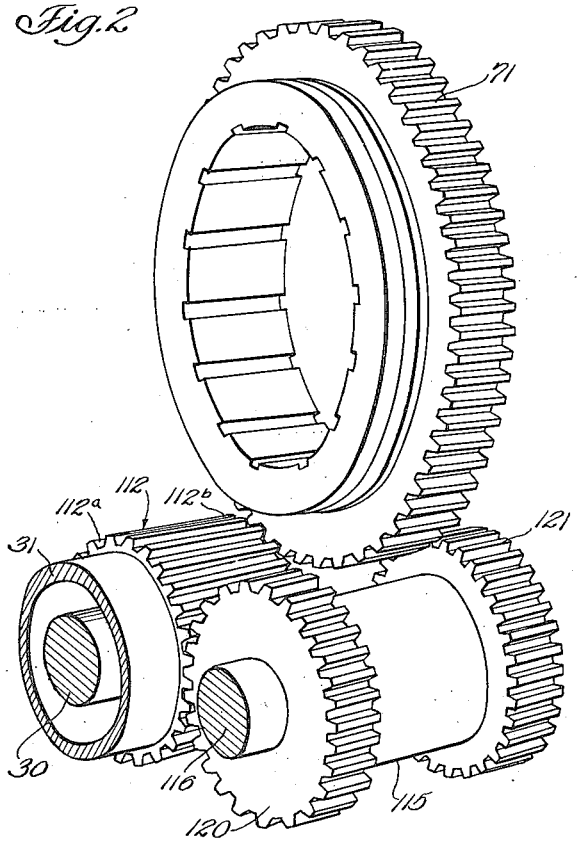
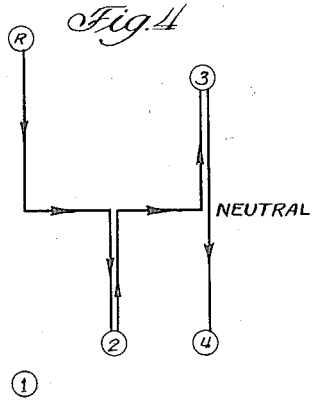
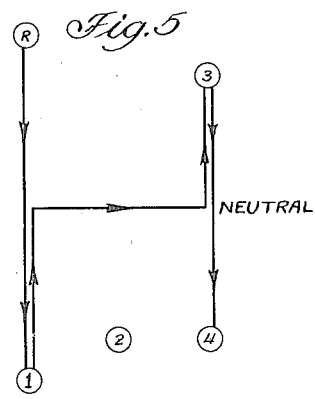
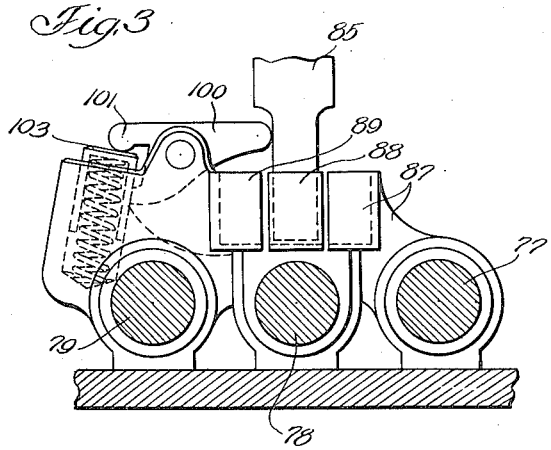
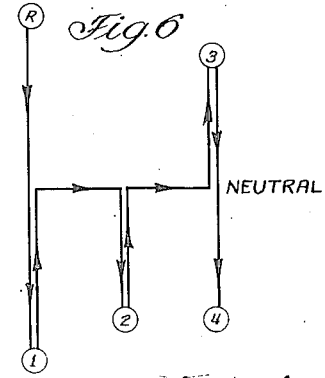
Inventor:
Robert Lapsley Patented Mar. 19, 1935

1,994,773

UNITED STATES PATENT OFFICE 1,994,773

TRANSMISSION

Robert Lapsley, Berrien Springs, Mich., assignor to Clark Equipment Company, Buchanan, Mich., a corporation of Michigan Application March 28, 1932, Serial No. 601,527

1 Claim. (Cl. 74—333)

The present invention relates to power transmission devices, and more particularly to a change speed transmission for use in automotive vehicles, such as passenger cars, busses, trucks and the like, and is principally concerned with the type of transmission devices employing or providing more than three forward speeds, as compared with the type of transmission most generally in use at the present time which provides only three speeds forward, which is generally considered to be the standard transmission at the present time.

In a great majority of the transmissions with which I am familiar, many of those providing four or five speeds forward are so arranged that the operation of the gear shift lever controlling the various gear changes is materially different than the operation of the gear shift lever controlling the so-called standard transmission.

The standard type of transmission referred to is generally controlled by a gear shift lever in the center of the vehicle and the customary shift rods and forks controlling the change gears are so arranged that reverse drive is established when the upper or operating end of the gear shift lever is in a forward and lefthand position, first or low speed drive being engaged when the upper end of the gear shift lever is in a rearward and lefthand position, second or intermediate speed being established when the gear shift lever is in a forward and righthand position, and high speed or direct drive being effected when the gear shift lever is in a rearward and righthand position.

With the development of transmissions which provided more than three speeds forward, some of such transmissions providing a fourth or overdrive, and others providing an extra low speed drive, such transmissions were frequently arranged so that the reverse or the extra low speed position of the gear shift lever was such that the customary or usual sequence of operations in going from one drive to another was interfered with, so that an operator skilled in the use of vehicles having the customary three-speed forward transmission sometimes accidentally engaged the wrong drive. Not only did this condition tend to cause accidents, but also it was confusing to operators who were accustomed to use the standard transmission.

The principal object, therefore, of the present invention is the provision of a new and improved transmission for automobiles and the like wherein the change gears are so arranged that the operation of shifting the gears is substantially identical with the operation of a standard transmission, yet providing a transmission which is capable of four speeds forward. To be specific, by the operation of a standard transmission is meant a movement of the gear shift lever from reverse position directly rearwardly into the first low speed, then forwardly and to the right for second speed, and lastly, directly rearwardly from second to third or high speed.

In using vehicles having more than three speeds forward, it is not necessary at all times to use all of the gear changes in getting under way, except when moving heavy loads or in rough going. Generally, operators of vehicles having a four-speed forward transmission either omit the first or lowest gear change or the second speed, that is, an operator either starts in first speed and goes then to third and finally fourth, or he starts in second and then goes to third and fourth speed. Unless, as indicated, the road is exceptionally rough or the going is heavy, or, except where the load is considerably greater than normal, the operator can usually omit either first or second gear change, and with this operation in mind the present invention contemplates the provision of a transmission in which both low speed and second speed are opposite reverse so that, taken together, first and second speeds are in a position corresponding to second speed in an ordinary transmission. Remembering that in a standard transmission the gear shift lever may be moved from reverse directly rearwardly to engage low speed, and then forwardly and to the right for second, and then rearwardly for third, or direct, the transmission of the present invention therefore groups the first two speeds forward, so that in a transmission constructed according to the present invention the operator may move the gear shift lever from reverse rearwardly to optionally engage either first or second in much the same manner that the gear shift lever is moved directly rearwardly to engage low speed in a standard transmission, and then in my improved transmission the gear shift lever may be moved from either the first or second speed forwardly and then to the right to engage third speed, which corresponds to second speed in an ordinary transmission, and then from third the operator may move the gear shift lever directly rearwardly to engage the highest drive, exactly in the same manner that the gear shift lever is moved in an ordinary or standard transmission. This particular type of transmission is especially advantageous when equipped with a free wheeling clutch which is operative only in second, third and fourth speeds and some restraining latch means arranged to prevent accidental engagement of the reverse and low speed drives.

While I have outlined above the broad or generic purpose of the present invention, it is to be understood that other objects and advantages of the present invention will be apparent from the following detailed description, taken in conjunction with the accompanying drawings, in which:—

Figure 2 is a perspective view illustrating the relative position of certain gears as they are arranged in my improved transmission, which gears are used to establish low speed and reverse drive;

Figure 3 is a cross-sectional view taken approximately on the line 3—3 of Figure 1; and Figures 4, 5 and 6 are diagrammatic sketches showing the path of movement of the upper or operating end of a gear shift lever in securing the various gear changes provided in the present transmission.

Figure 1:
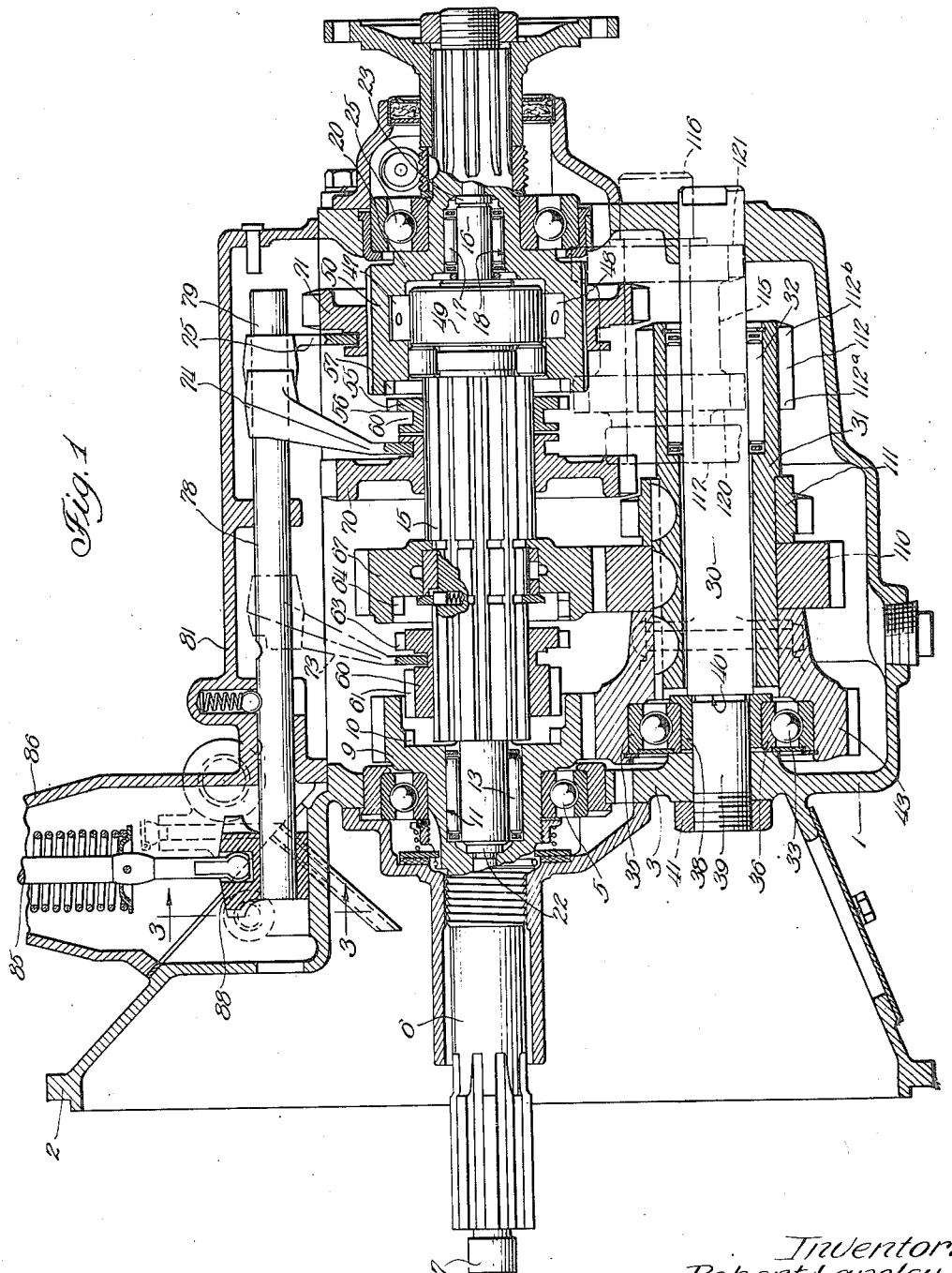
Figure 1 is a vertical cross-sectional view through one structural embodiment of the present invention.

Referring now more particularly to Figure 1, it is to be noted that the transmission there disclosed is similar to one of the transmissions I have illustrated in my co-pending application, Serial No. 512,595, filed January 31, 1931. Reference may be had, therefore, to my co-pending application for specific details of the transmission which are not particularly described in this application.

In Figure 1, the gear box or transmission housing 1 carries at its forward portion a clutch or bell housing 2, preferably formed integrally with the housing 1, the forward wall 3 of the housing 1 being provided with bearings 5 in which the rear end of the clutch or driving shaft 6 is journaled. The forward end of the driving shaft 6 is provided with a reduced portion 7 which has bearing support in a socket formed or associated with the rear end of the crank shaft of the motor (not shown), as is well understood in the art.

The rear end of the driving shaft 6 has a driving gear 9 formed thereon or secured thereto just to the rear of the bearing 5. The driving gear 9 has clutch teeth 10 and an interior bore 11, the latter receiving roller bearings 13 which support the forward reduced end of an intermediate spline shaft 15. The rear end of the intermediate shaft 15 is provided with a reduced end 16 journaled, as by bearings 17, in a bore 18 formed in a final driven shaft 20. This corresponds to the construction illustrated in my co-pending application referred to above. Thrust washers 22 and 23 are arranged at the front end and at the rear end of the intermediate shaft 15 and seat in the sockets 11 and 18, respectively, and serve the purpose of maintaining the intermediate shaft in proper axial position. The bearing 5 is of well known type and capable of taking both axial and radial thrusts, and serves as the means for supporting the rear end of the driving shaft 6 and the forward end of the intermediate shaft 15 in the housing 1. Similar bearing means 25 support the final driven shaft 20 and the rear end of the intermediate shaft 15.

A fixed shaft 30 is secured in the lower part of the transmission housing 1. The fixed shaft 30 forms the support for a tubular lay or countershaft 31. The rear portion of the countershaft 31 is carried on the fixed shaft 30 by roller bearing means 32 and the forward end of the countershaft 31 is carried upon bearing means 33 arranged in the same manner and embodying the principles disclosed and claimed in my co-pending application, Serial No. 512,596, filed January 31, 1931. Specifically, the bearing means 33 comprises an outer race 35 and an inner race 36 between which the bearing elements are received. The inner race 36 is carried upon a flanged hub or sleeve 38 and the sleeve is received upon the reduced threaded end 39 of the fixed shaft 30, the shoulder 40 between the end 39 of the fixed shaft and the fixed shaft proper abutting against the flanged end of the sleeve 38, which in turn presses the inner face 38 against the front wall 3 of the transmission gear box when the nut member 41 on the threaded end 39 is tightened. The outer race 35 is carried within a correspondingly formed recess in a countershaft gear 43 which is in mesh with and is driven by the driving gear 9 and is keyed or otherwise rigidly secured upon the forward end of the tubular shaft 31, as clearly explained in the co-pending application referred to above.

Between the rear end of the intermediate shaft 15 and the final or driven shaft 20 is an overrunning clutch connection, indicated in its entirety by the reference numeral 47, and which is of the same design as that illustrated in my co-pending application, Serial No. 512,595, referred to above. Since the present invention is not primarily concerned with the details per se of the overrunning clutch connection except as a part of the combination as pointed out below, it will not be necessary to describe the same overrunning clutch in detail. It suffices to note that the overrunning clutch 47 comprises clutch element 48 positioned in and adapted to wedge between one clutch member 50 formed on the intermediate shaft 15 or secured thereto, and a second clutch member 50 formed on the final driven shaft 20. The clutch member 49 is arranged to drive the driven shaft 20 through the overrunning clutch elements 48. As disclosed in my co-pending application, the overrunning clutch 47 is adapted to be controlled by means of a sliding clutch hub 55 having teeth 56 adapted to engage similar teeth 57 on the forward portion of the driving shaft 20 or the clutch element 50. The clutch hub 55 is splined onto and turns with the intermediate shaft 15, and, hence, when the clutch hub 55 is shifted rearwardly so that the teeth 56 engage the teeth 57, the overrunning clutch 47 is rendered inoperative or locked out. When locked out, the two shafts 15 and 20 turn together and may be considered, for the purposes of this invention, as a single spline shaft, particularly since the forward portion of the final driven shaft 20 is itself splined.

The sliding clutch hub 55 is provided with a shift groove 60 which is adapted to receive the arms of a shift fork pivoted or movably mounted in the transmission housing 1 in any desired manner. The method of operating the sliding hub 55 to control the overrunning clutch connection is not of the essence of the present invention and will not be described further.

The two shafts 15 and 20 are splined, as indicated above, and are arranged to receive shiftable gear means thereon which are movable selectively to control the various gear changes possible in this type of transmission. Near the forward end of the intermediate shaft 15 a sliding clutch dog 60 is mounted having at its forward end teeth 61 arranged to engage with the teeth 10 on the driving gear 9 when the clutch dog 60 is shifted forwardly, the sliding dog being provided with a second set of teeth 63 at its rear end which are arranged to engage with teeth 64 formed on a gear 67 journaled or otherwise made freely rotatable upon the intermediate shaft 15 by means more clearly disclosed and claimed in my co-pending application Serial No. 512,596, referred to above. It therefore suffices to note here that the sliding dog 60 forms the means for optionally connecting the floating gear 67 to the intermediate shaft 15, as by engaging teeth 63 with teeth 64, as explained above.

In addition to the sliding dog 60 and the gear member 67 the shafts 15 and 20 carry two other gear members. The gear 70 is splined for sliding movement on the intermediate shaft 15, and the gear 71 is splined for sliding movement on the forward portion of the final driven shaft 20. The sliding dog 60 and the gears 70 and 71 each carry shift grooves in which shift forks 73, 74 and 75 are received.

As is usual in this type of transmission, the shift forks 73 to 75 are carried upon movable shift rods 77, 78 and 79, respectively. The shift rods are carried by the cover plate 81 forming the top of the transmission housing or gear box 1. The shift rods are adapted to be controlled by a gear shift lever 85 mounted for universal movement in a pedestal or supporting portion 86 formed either on the housing 1 or on the cover plate 81 as may be desired. The forward ends of the shift rods carry yokes or shift fingers 87, 88 and 89, respectively, as best shown in Figure 3, which are so arranged that any one of the shift rods may be engaged by the lower end of the gear shift lever 85 and moved longitudinally either forwardly or rearwardly to engage the selected drive.

In transmissions of this type, it is frequently desirable to provide some sort of latch arrangement on, or associated with, the shift rod controlling the reverse and the low speed gear changes for the purpose of providing a noticeable resistance to the movement of the gear shift lever toward engagement with the shift rod so that the operator will be aware of the fact if the gear shift lever 85 is accidentally moved toward engagement for either reverse or low speed drive. The resistance is adapted, however, to be easily overcome once the gear shift lever is started into engagement with the shift fingers 89 on the shift rod 79. This latch mechanism includes a short pivoted lever 100 mounted for locking movement on the abutment member or shift fingers 89. One end of the short lever 100 is adapted to be contacted by the lower end of the gear shift lever 85 and the other end 101 of the rocking lever 100 is arranged to contact with a spring pressed plunger 103 carried in a suitably formed bore in the abutment member 89. The plunger 103 urges the end 101 upwardly to a point where the lever 100 is almost, but not quite, at right angles to the gear shift lever 85. The initial movement of the gear shift lever 85 toward the shift fingers 89 is resisted by a considerable force, due to the fact that the lever 100 is almost at right angles to the gear shift lever, but as the lever 100 is rocked upwardly by the movement of the gear shift lever, the effective resistance established by the spring pressed plunger 103 and the lever 100 is materially lessened so that the gear shift lever may be moved into cooperation with the shift rod 79 to secure either reverse or low speed.

By starting the vehicle in second speed, then progressing through third and fourth, it will be observed that the two speeds protected by the restraining latch 100 are not utilized at all. This arrangement is a convenient one in connection with free wheeling transmission where, as best shown in Figure 1, the overrunning clutch is interposed between the intermediate and final driven shafts, because all speeds in which the gear shift lever is freely movable are free wheeling speeds and the speeds in which it is necessary to overcome the resistance of the latch 100 are those in which the overrunning clutch is not employed.

Suitably formed gears are fixedly mounted or formed on the tubular lay shaft 31 for the purpose of cooperating with the gear members 67, 70, and 71 on the shafts 15 and 20 in establishing forward or reverse drive through the selected gear ratio. A gear member 110 is keyed onto the countershaft 31 just in rear of the driven gear 43 and a second gear member 111 is keyed onto the countershaft 31 just in rear of the gear member 110. The rearward end of the countershaft 31 is formed with an elongated gear 112 thereon. Preferably, the gear 112 is milled or machined on the countershaft 31, but may be separately formed and secured thereon in any manner desired. A double gear or compound gear 115 is arranged on a fixed shaft 116 secured in the housing 1 as by being mounted in an opening in the rear wall of the housing and in an opening formed in a web or projection 117 formed in one of the side walls of the transmission housing. The double gear 115 is journaled for rotation on the shaft 116 and is provided with two gear portions which may be of equal size, although this is not necessary. The forward portion 120 is arranged in mesh with the front portion 112a of the elongated gear 112 while the rear portion 121 of the double gear 115 is spaced an appreciable distance in rear of the rear portion 112b of the gear 112 on the countershaft 31. Obviously, the front and rear portions 112a and 112b may be separate gears if desired, but I prefer to form the gear 112 as shown.

The operation of my improved transmission is substantially as follows:— When it is desired to engage reverse drive, the gear 71 splined on the final driven shaft 20 is shifted rearwardly so that its teeth engage with the rear gear portion 121 of the double gear 115. When so arranged, the driving torque is transmitted from the driving gear 9 to the countershaft 31 through the driven gear 43 and from the countershaft 31 the torque is transmitted through the front portion of the gear 112 to the front gear portion 120 of the double gear. The resulting rotation of the double gear 115 causes the rear gear portion 121 thereof to rotate the gear 71 to drive the final driven shaft. When the gear member 71 is shifted forwardly, the teeth thereof engage the rear portion 112b of the gear 112 so that now the drive is transmitted through the gear member 71 and to the final driven shaft without going through the double gear. This is the lowest of the forward gear ratios.

The movement of the gear 71 is controlled through the shift fork 75 which, in turn, is mounted upon and controlled by the shift rod 79. As best shown in Figure 3 this shift rod is engaged when the lower end of the gear shift lever 85 is moved to the left of the figure. Since Figure 3 is a view looking rearwardly, this movement of the gear shift lever corresponds to the lefthand movement of the upper end of the gear shift lever, this position of the gear shift lever being indicated in Figures 4, 5 and 6. If reverse drive is to be established, the upper end of the gear shift lever is moved forwardly from the neutral plane, this position being indicated by the letter "R" in Figures 4, 5 and 6.

Referring again to Figure 1, it will be seen that the gear 70 is adapted to be moved forwardly into engagement with the gear 111 whenever the shift fork 74 is actuated by a forward movement of the shift rod 78. This corresponds to second speed forward and the shift rod 78 is in a central position with respect to the other shift rods, as shown in Figure 3. Since the shift rod 78 needs to be moved forwardly to cause engagement between the gears 70 and 111, this corresponds to a rearward movement of the upper or operating end of the gear shift lever 85 from its neutral plane. This position of the upper end of the gear shift lever is indicated in Figures 4, 5 and 6 by the numeral 2.

The clutch dog 60 is controlled by the shift fork 73 and is movable to two operative positions, namely, rearwardly into engagement with the floating gear 67 to effect third speed forward, and forwardly to engage the driving gear 9 to effect fourth speed forward or direct drive. The shift fork 73 is controlled by the shift rod 77 which is mounted in the transmission gear box at the lefthand side of both shift rods 78 and 79. This causes the upper end of the gear shift lever 85 to occupy a righthand position when either third or fourth speed forward is established, these positions of the upper end of the gear shift lever being indicated in Figures 4, 5 and 6 by the numerals 3 and 4, respectively.

Referring now more particularly to Figures 4, 5 and 6, it will be observed that my improved transmission has the various gears thereof so arranged that the position of the upper end of the gear shift lever for reverse drive is on the side of the neutral plane opposite the position the gear shift lever takes in either first or second speeds forward. When either first speed or second speed is omitted, this arrangement has the very important advantage of permitting a sequential movement of the gear shift lever in substantially the same manner in which the gear shift lever is moved in a standard three speed forward transmission. As explained in the first part of the specification, it is only relatively seldom that all four forward speeds need to be employed in getting under way, operators generally starting in either first or second. Figure 4 illustrates the movement of the upper end of the gear shift lever when the machine is operated by starting forward in second speed omitting first speed. In this figure the upper end of the gear shift lever is shown as moving rearwardly, which is downwardly in Figure 4 as well as in Figures 5 and 6, into engagement with second speed forward. In this movement some lateral movement of the gear shift lever is necessary, but this is not confusing because the movement of the gear shift lever from reverse back to second speed is in the same general direction as a gear shift lever is moved from reverse to first speed in a standard three-speed forward transmission. When the machine is started forwardly in second speed, the operator shifts out of second and into third by a forward movement, then a lateral movement, and, lastly, a forward movement into third speed, which is exactly the same movements executed in shifting from low to second speed in a standard three-speed forward transmission. After an appreciable velocity is attained, the operator shifts from third to fourth by a direct rearward movement of the gear shift lever, exactly as is done in shifting from second to third in a standard three-speed transmission.

When the machine is started in the lowest or first speed forward, the movement of the gear shift lever is also substantially the same as in a standard three-speed transmission. Movement of the gear shift lever from reverse directly rearwardly engages the low speed gear ratio, and then a forward movement and a lateral movement succeeded by a second forward movement will engage third speed, this sequence of movement, namely, forwardly, laterally and again forwardly, is exactly the same as in a standard three-speed transmission, and also approximately the same as shifting from second to third illustrated in Figure 4. The shift from third to fourth is by moving the gear shift lever directly rearwardly as in Figure 4.

In the above description, I have illustrated the movement of the upper ends of the gear shift lever in moving from reverse to either first or second, then to third, and, lastly, to fourth, and have emphasized the fact that this movement, regardless as to whether first or second speed is employed in starting, is practically exactly the same as in any standard three-speed forward transmission. In showing the movement of the gear shift lever from reverse, I have done so only to show or illustrate the entire series of movements. It will be clear, of course, that the most important part of this feature of my invention resides in the fact that in starting the vehicle, either in first or second, the movement of the gear shift lever is practically exactly the same as in the ordinary three-speed transmission, namely, forwardly, laterally to the right, and then forwardly, and, lastly, directly rearwardly. In this manner, the operation of a vehicle having my improved four-speed forward transmission is in no material respects different from the customary three-speed transmission and will not be confusing to the operator accustomed only to the latter. Reverse is in its usual position and whether the operator selects first or second speed to start the forward movement depends upon whether he moves the gear shift lever directly rearwardly into first or moves it into second by giving the lever a slight lateral displacement to the right to engage the second speed shift rod.

Figure 6 illustrates the movement of the gear shift lever in utilizing all four forward speeds to get under way, as may be necessary in deep mud, snow or sand, and, as explained above, is relatively seldom employed. In this case, the movement of the gear shift lever is only slightly different from the customary three-speed transmission, which difference lies in the fact that in going from first to second it is necessary to move the gear shift lever forwardly and then laterally, and, lastly, rearwardly. After running in second speed, the shift to third and fourth then becomes exactly the same as in a three-speed transmission.

While I have shown and described in detail the preferred structural embodiments of the present invention, it is to be understood that my invention is not to be limited to the structure shown and described, but that, in fact, widely different means may be employed in the practice of the broader aspects of my invention, as defined in the appended claim.

What I claim, therefore, and desire to secure by Letters Patent is:—

A change speed transmission for four forward speeds and reverse comprising, in combination, a housing, a driving shaft, an intermediate shaft, a countershaft and a final driven shaft, all of said shafts being journaled in said housing, a shiftable gear member slidable on said intermediate shaft and movable forwardly to engage second speed drive, a second member slidable on said intermediate shaft and shiftable forwardly to engage direct drive and rearwardly for an intermediate drive, means controlling the movements of said shiftable members, respectively, an overrunning clutch interposed between the intermediate and final driven shafts, a third shiftable gear member shiftable forwardly on the final driven shaft for effecting low speed drive in the same direction as said first shiftable gear member is shiftable to select second speed drive, said third shiftable gear member being shiftable rearwardly to engage reverse speed drive, and means for controlling the movements of said last named shiftable gear member, the juxtaposition of the low and second speed positions adjacent one another and opposite the reverse speed position providing for progressive selection of speeds in sequential uniform movements irrespective of whether low speed, without overrunning therein, or second speed, with overrunning therein, is selected to start.

ROBERT LAPSLEY.